United States Patent
Cannon et al.

(10) Patent No.: US 6,292,543 B1
(45) Date of Patent: Sep. 18, 2001

(54) APPARATUS AND METHOD WHICH SAVES CALL RELATED INFORMATION WHEN THE STATUS OF RECORDED VOICE MESSAGE IS CHANGED REMOTELY

(75) Inventors: Joseph M. Cannon, Harleysville; James A. Johanson, Emmaus; Richard Lawrence McDowell, Chalfont, all of PA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/007,771

(22) Filed: Jan. 16, 1998

(51) Int. Cl.$^7$ ............................. H04M 1/64; H04M 11/00
(52) U.S. Cl. .................. 379/67.1; 379/74; 379/88.11; 379/88.12; 379/88.22; 379/102.01
(58) Field of Search .................. 379/67.1, 74, 88.01, 379/88.11, 88.12, 88.13, 88.17, 88.21, 92.04, 93.09, 93.12, 93.13, 93.27, 100.01, 102.01, 102.03, 93.02, 112–114, 68, 93.24, 127, 142, 201.01, 88.22, 88.23, 88.24

(56) References Cited

U.S. PATENT DOCUMENTS

| | | | |
|---|---|---|---|
| 4,604,499 | * 8/1986 | Hughes | 713/164 |
| 4,626,623 | * 12/1986 | LaHaye | 379/903 |
| 4,924,496 | 5/1990 | Figa et al. | 379/142 |
| 5,220,657 | * 6/1993 | Bly et al. | 395/425 |
| 5,394,445 | * 2/1995 | Ball et al. | 379/67 |
| 5,400,393 | * 3/1995 | Knuth et al. | 379/88 |
| 5,483,577 | 1/1996 | Gulick | 379/88 |
| 5,524,140 | * 6/1996 | Klausner et al. | 379/67 |
| 5,568,540 | * 10/1996 | Greco et al. | 379/88 |
| 5,608,786 | * 3/1997 | Gordon | 379/100 |
| 5,742,905 | * 4/1998 | Pepe et al. | 455/461 |

* cited by examiner

Primary Examiner—Allan Hoosain
(74) Attorney, Agent, or Firm—William H. Bollman

(57) ABSTRACT

A voice messaging system and method includes a receiver to receive information relating to an incoming telephone call and memory to store the information relating to the incoming call. A processor initiates an outgoing announcing message in response to the incoming call. A voice recorder records in the memory a voice message corresponding to the incoming call. A detector, is operatively associated with the processor, to detect a remote log-in such that the processor is remotely controlled to access a recorded voice message. An indicator visibly or audibly indicates an occurrence of the remote log-in. The processor permits a status of the voice message to be affected in memory while information relating to the voice message and/or information relating to the remote log-in which had affected the voice message is maintained.

25 Claims, 4 Drawing Sheets

APPARATUS AND METHOD WHICH SAVES CALL RELATED INFORMATION WHEN THE STATUS OF RECORDED VOICE MESSAGE IS CHANGED REMOTELY

BACKGROUND OF THE INVENTION

1. Field of the Invention

This invention relates to a voice messaging system capable of receiving and storing call related information and more particulary, to a voice messaging system which indicates to the user that a remote log-in has occurred, which retains that call related information associated with the remote log-in that has deleted or otherwise affected a particular voice message and/or the call information relating to the deleted or affected voice message.

2. Description of Related Art

Voice messaging systems have become an essential part of our society. For instance, voice mail type systems installed with private branch exchanges (PBXs) are found in most businesses, while home usage of telephone answering devices is ever-increasing.

Many telephone companies offer a special service which transmits call related information to a called party. One such service is called Caller ID. Using Type I Caller ID which is transmitted while the telephone is on-hook, typically a caller's telephone number and/or household name is transmitted by the telephone company to the called party generally during the silent interval between the first two rings. Type II caller ID receives caller ID information in an off-hook condition.

When an incoming call is answered by the voice messaging system, and if the caller leaves a voice message, the voice message and call related information associated therewith may be stored in the voice messaging system to be retrieved by the user during playback of the voice message. Many voice messaging systems may be accessed remotely to playback and/or delete recorded voice messages from a remote location. However, when a voice mailbox of a voice mail system, or a particular telephone answering device (TAD) is shared by a number of users, e.g., a large family, it may be undesirable for one user to delete voice messages remotely, particularly if they were intended for another user, and particularly if the other users are unaware of the remote deletion of the voice message. In addition, with voice messaging systems which are accessible for playback from a remote location, security issues may arise when unknown remote users access, playback, and/or delete voice messages. There is no record of an unauthorized remote deletion of a voice message.

One conventional Type I/Type II Caller ID system is shown in FIG. 4 and includes customer premises equipment 111 having a call information detector/receiver 112 which displays the telephone number or other call related information of a calling party received from the central office 113 over the telephone line 114. For Type I functionality, when the customer premises equipment 111 is on-hook, the telephone number or other call related information of the calling party is detected by the call information detector 112 during the silent interval between the first and second rings and is compared with telephone numbers or other call related information stored in a call related information directory 116 by a controller 118. For Type II functionality, i.e., while in a call waiting mode, the call related information follows a caller ID alerting signal sequence (CAS tones). Controller 118 is a processor, e.g., a microprocessor, a digital signal processor, or a microcontroller. The call related information directory 116 is stored in Random Access Memory (RAM). When the incoming telephone number or other call related information from a calling party matches a telephone number or other call information in the call related information directory 116, that telephone number and/or the calling party's household name associated with that telephone number are displayed on a display device 128. Alternatively, the call information directory is located at the central office and household name or other call related information is transmitted to the customer premises equipment 111 in the known manner. The TAD includes a voice recorder/playback circuit 120 having a standard microphone 122 and speaker 124 electrically connected thereto. An alpha-numeric keypad 126 is also provided for programing functions.

There is a need, however, to add flexibility to a voice messaging system so as to not only receive and store call related information but, in addition, to indicate to the user that a remote log-in has occurred and to retain call related information associated with the remote log-in which is responsible for remotely deleting or otherwise affecting the status of a received voice message and/or call information relating to the deleted or affected voice message.

SUMMARY OF THE INVENTION

In accordance with the principles of the present invention, a voice messaging system and method includes a receiver to receive information relating to an incoming telephone call and memory to store the information relating to the incoming call. A processor initiates an outgoing announcing message in response to the incoming call. A voice recorder records in the memory a voice message corresponding to the incoming call. A detector detects a remote log-in such that the processor is remotely controlled to access a recorded voice message. An indicator visibly or audibly indicates an occurrence of the remote log-in. The processor permits a status of the voice message to be affected in memory while information relating to the voice message and/or information relating to the remote log-in which had affected the voice message is maintained.

BRIEF DESCRIPTION OF THE DRAWINGS

Features and advantages of the present invention will become apparent to those skilled in the art from the following description with reference to the drawings, in which.

DETAILED DESCRIPTION OF THE PRESENTLY PREFERRED EXEMPLARY EMBODIMENTS

The present invention relates to a voice messaging system such as a telephone answering device or voice mail system capable of receiving and storing information regarding an incoming call, which indicates to the user that a remote log-in has occurred, and which retains call related information relating to a remote log-in that affects a status of a voice message and/or which retains call related information relating to the affected voice message. The embodiment described is a telephone answering device, but the principles disclosed are equally applicable to voice messaging systems in general. Moreover, while the disclosed embodiment relates to storage of call related information when a voice message is remotely deleted, the present invention is equally applicable to the storage of call related information when any status change of a voice message has occurred.

Figure 1:
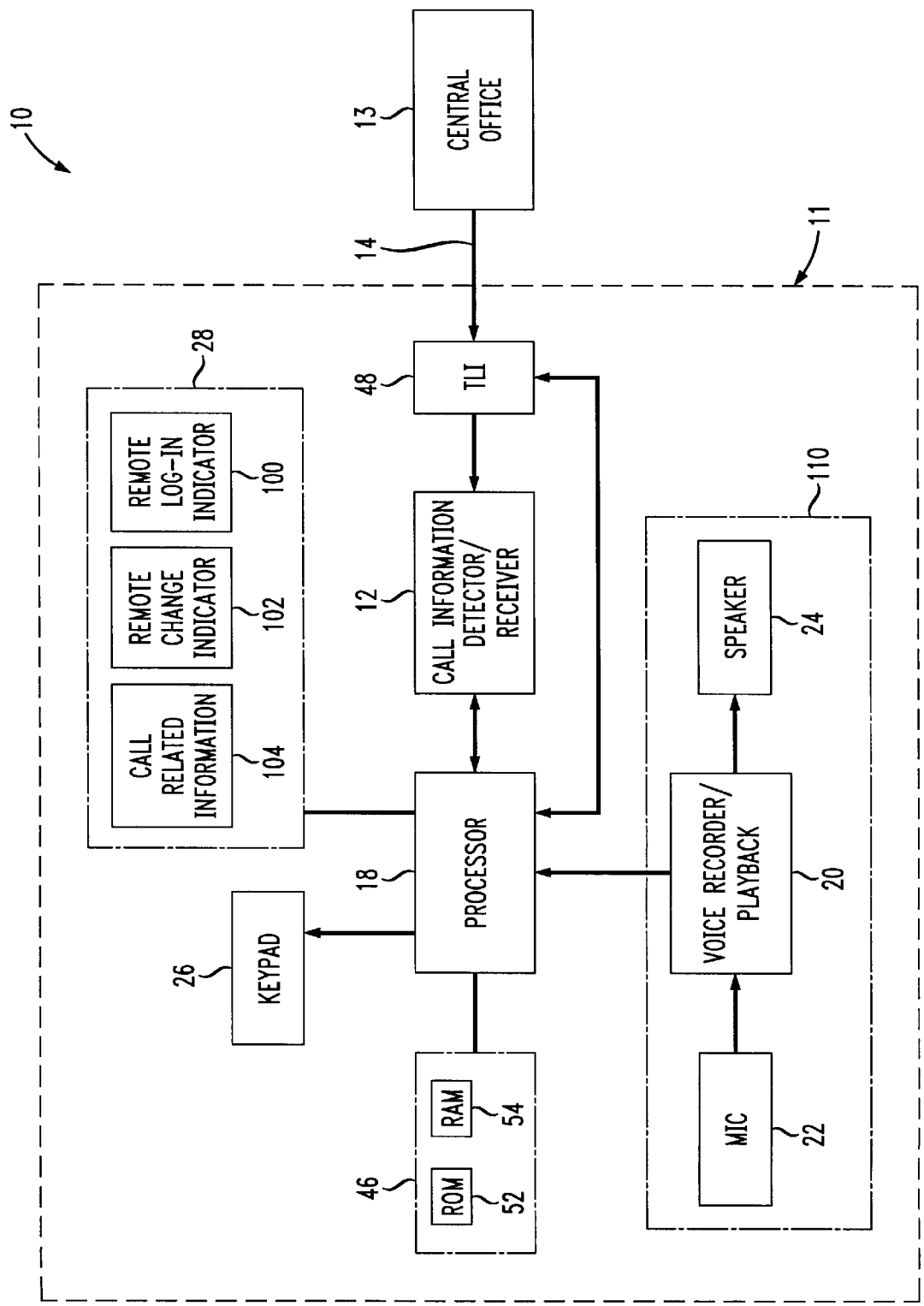
FIG. 1 is a block diagram illustrating a TAD provided in accordance with the principles of the present invention.

With reference to FIG. 1, a telephone answering system, generally indicated at 10, includes a telephone answering device (TAD) 11 having a call information detector/receiver 12 which receives call related information from a central office 13 over a telephone line 14. Using, for example, Caller ID, call related information such as a telephone number and the household name of the calling party may be transmitted to the TAD between the first and second rings of an incoming call. The call related information is stored in a centralized database at the telephone company central office 13 which provides the Caller ID service. When the TAD 11 is on-hook, e.g., for Type I caller ID type service, call related information stored at the central office 13 is transmitted to the TAD 11 by way of the detector/receiver 12. The call related information may be stored in memory at the TAD 11 and may be displayed on display 28. Memory 46 is provided and includes Read Only Memory (RAM) 52 and Random Access Memory (Ram) 54, as will be explained in more detail below.

At any appropriate time during an incoming call, the caller may key-in predefined user ID information via DTMF tones indicating that the caller wishes to listen to stored voice messages. In the conventional manner, the DTMF tones are received and detected by the recorder/playback circuit 20 or controller 18, and converted into control signals. The controller 18 responds to the control signals by causing playback of a recorded voice message, or by causing deletion of a recorded voice message.

Figure 2:
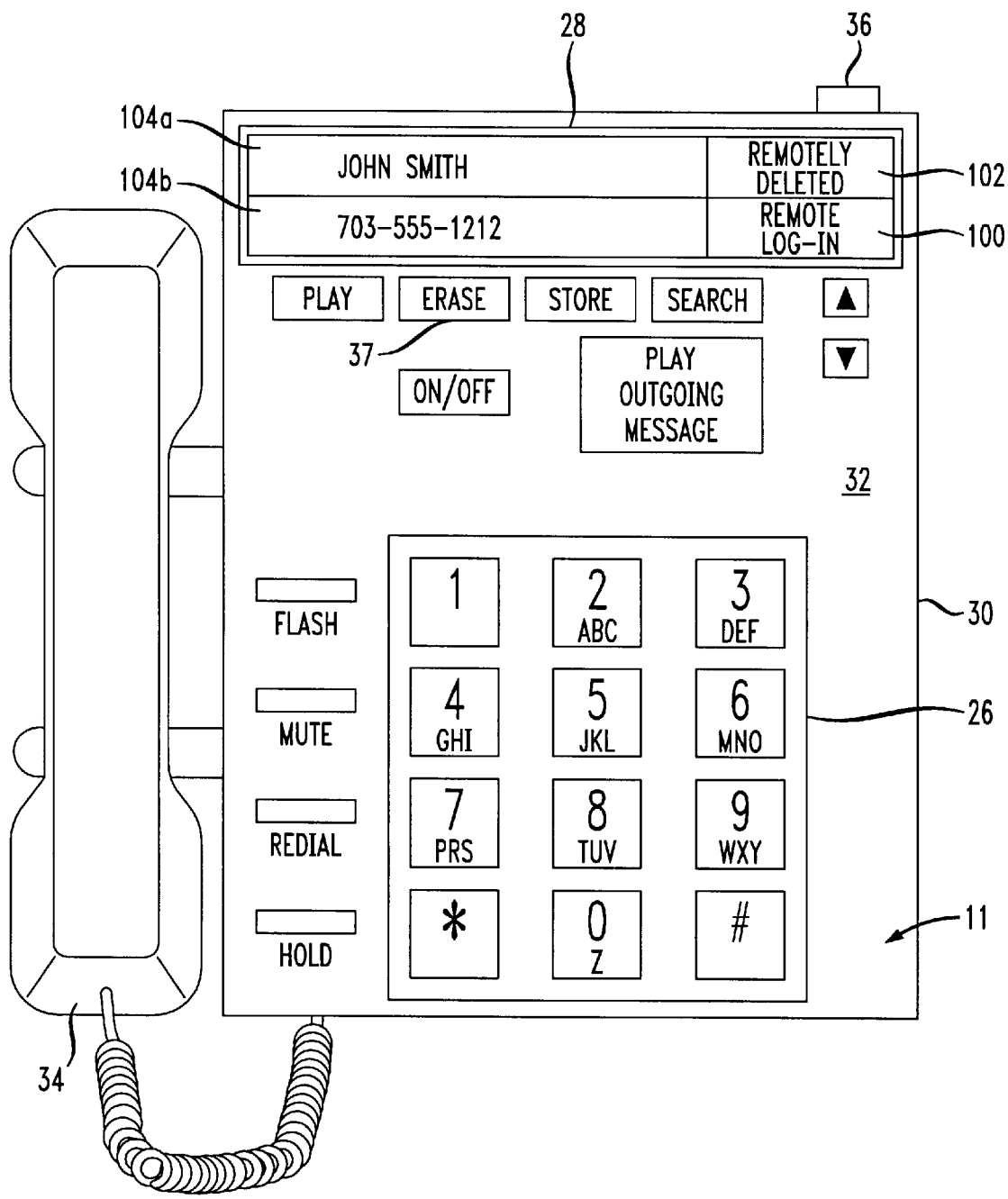
FIG. 2 is a physical view of a TAD in conformance with the principles of the present invention.

If a recorded voice message is deleted or otherwise affected remotely, the call related information of the deleted or affected call is maintained in a log. In this way, when a local user is playing voice messages at the TAD 11, the affected call's call related information is maintained and can be displayed on a display. Advantageously, the display further indicates, along with the call related information 104 relating to the voice message that was affected and/or the call related information relating to the remote log-in, that the status of the voice message had been changed remotely. In the illustrated embodiment, the display 28 will indicate "Remotely Changed" or "Remotely Deleted" in the Remote Change indicator 102 as shown in FIG. 2. It can be appreciated that other types of indicators may be used to inform a user that a voice message had been deleted or otherwise disposed of remotely. For example, the controller 18 may cause the displayed call related information of a remotely deleted message to blink, or a voice prompt stored in memory may indicate that the message has been deleted or otherwise affected remotely. Thereafter, the call related information of a voice message which itself has already been deleted may be deleted from the log by actuating the ERASE button 37 on the console 30 (FIG. 2).

It is within the contemplation of the invention to utilize a PIN number or password to delete or otherwise affect a voice message. For example, a user may be required to enter a pin number or password, which are received by the TAD 11 as DTMF signals, to be authorized to delete or affect a voice message remotely. Alternatively, only certain messages may require a PIN number or password to be deleted. For example, based on the incoming caller ID information, certain callers can affect any voice messages they choose, while other callers may not be able to affect messages remotely or must enter a PIN number or password to affect a voice message remotely.

In addition to maintaining and displaying call related information 104 relating to voice messages that have been affected by remote log-in, it is also important for a user to know when a TAD 11 is being accessed remotely, e.g., for security reasons. With this information, the user may be able to determine if an unauthorized user played back, deleted or otherwise affected any voice message via remote log-in. Thus, in accordance with one aspect of the principles of the invention, when control signals are received from a remotely logged-in user, a flag is set in RAM memory 54 to indicate that a remote log-in has occurred. The flag is used to set a special indicator such as "Remote Log-in" on the remote Log-in indicator 100 portion of display 28, indicating to the user that a remote log-in has occurred. The call related information associated with the remote log-in is maintained and may be displayed. Alternatively, a pre-programmed voice prompt stored in memory 46 may be emitted from speaker 24 when a user is playing back recorded voice messages indicating that a remote log-in was made. The voice prompt may state for example, "There has been one remote log-in since your last message retrieval" or the like. Alternatively, a simple Light Emitting Diode (LED) may be illuminated to signal a remote log-in has occurred.

An alpha-numeric keypad 26 and the display 28 for displaying the call related information of the incoming call such as the telephone number at line 104b and/or the household name at line 104a associated with the incoming call are in communication with the controller 18. Controller 18 is an appropriate processor, e.g., a microprocessor, a digital signal processor, or a microcontroller.

The TAD 11 includes a voice module 110, including a voice recorder/playback circuit 20, a microphone 22 and a speaker 24 in communication with the processor 18. The function of the voice recorder/playback circuit 20 is to record voice messages in and to playback voice messages from the memory 54.

The processor 18 includes a dual tone, multiple frequency (DTMF) decoder 113 and a DTMF generator 115 relating to controls passed from a remotely logged-in incoming call. Alternatively, the voice module 110 may include software modules which perform DTMF detection and decoding.

In the illustrated embodiment of FIG. 2, the TAD 11 is packaged to fit within a portable console 30 which includes a control panel 32. The console 30 may be equipped with a standard handset 34 and a phone jack 36 which can be plugged into any standard telephone company modular jack, e.g., an RJ-11 jack. The control panel 32 includes a liquid crystal display (LCD) 28 and the alpha-numeric keypad 26. As noted above, the LCD 28 may display the call related information 104 of the incoming calls, e.g.,the telephone number and/or the household name associated with the incoming call. If there is no call related information relating to a particular incoming call, the LCD 28 is blank or otherwise indicates that the call related information is not available for that particular call.

Figure 3:
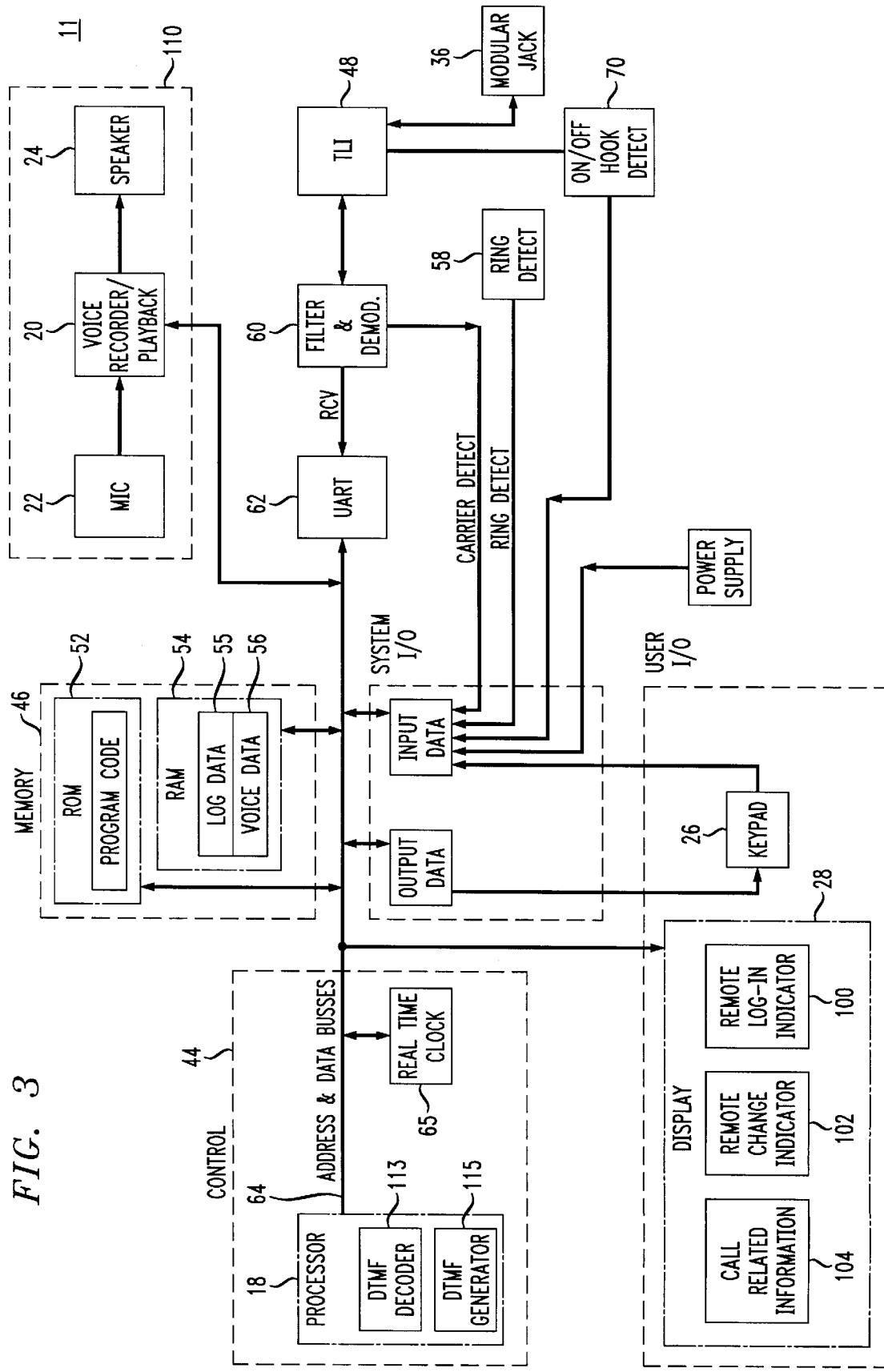
FIG. 3 is a more detailed block diagram of one embodiment of the TAD shown in FIG. 1.
Figure 4:
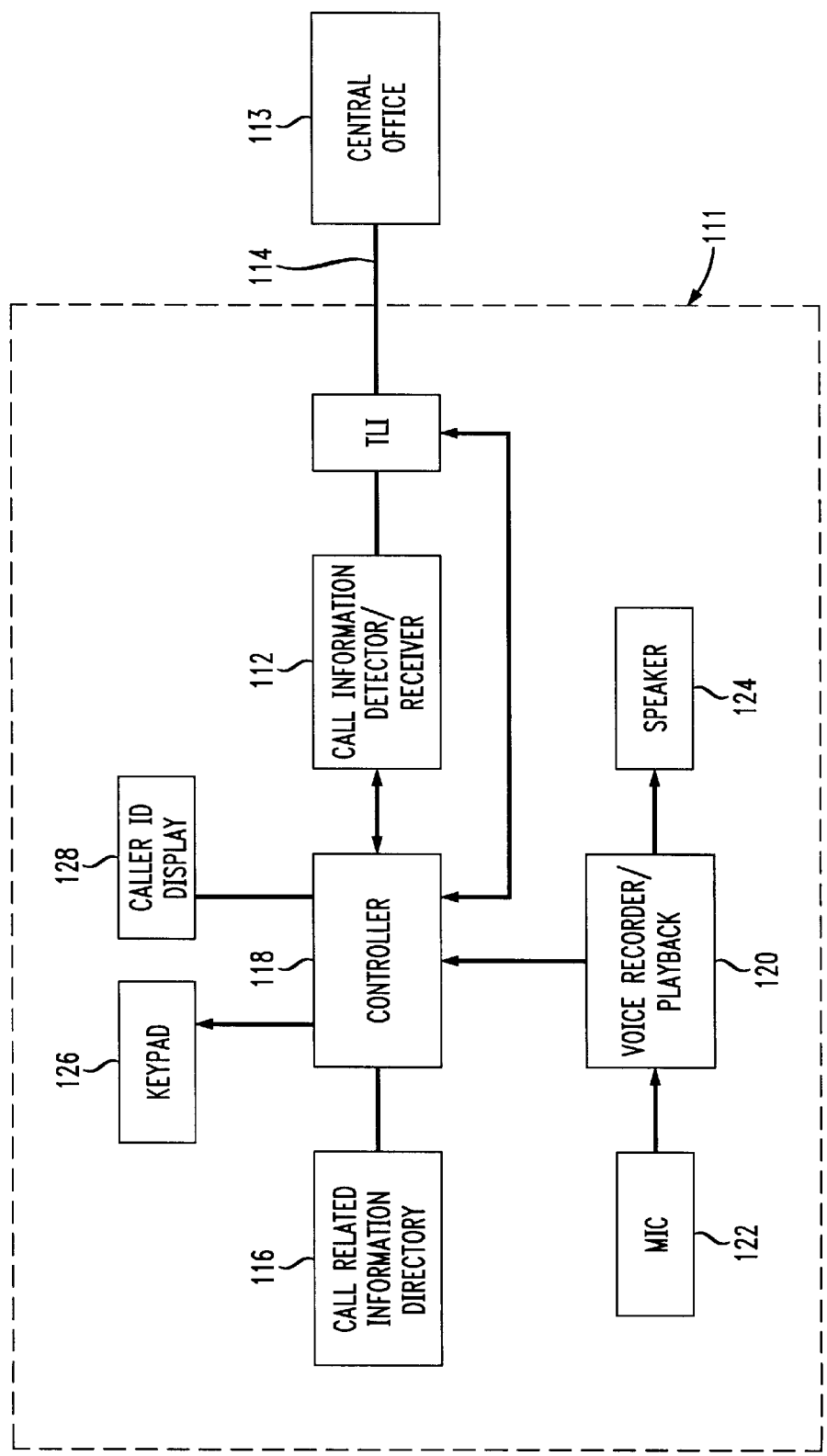
FIG. 4 is a block diagram of a conventional TAD.

FIG. 3 shows a detailed circuit diagram of the TAD 11 shown in FIGS. 1 and 2. The TAD 11 includes a control circuit 44, memory 46, the telephone line interface (TLI) circuit 48, display 28 and voice module 110.

Control circuit 44 includes the processor 18 which controls the TAD 11 by executing instructions that are stored in program code in ROM 52. Random access memory (RAM) 54 is also provided for general use and to store log data 55. The log data 55 includes call related information such as telephone numbers, household names, and voice message data 56.

A real time clock circuit 65 is also provided to provide timing for the TAD 11. The real time clock circuit 65 provides the TAD 11 with the current time and date.

The processor 18 controls the functioning of the voice module 110 such as PLAY, RECORD, ERASE and STOP signals.

The telephone line interface circuit 48 includes circuitry which permits the TAD 11 to be connected directly to a standard telephone module jack i.e., an RJ-11 jack The telephone line interface circuit 48 also includes various control and monitoring circuits that are common to ordinary telephones. These circuits are conventional and may include an electronic telephone circuit (not shown) for controlling dialing functions and for interfacing a telephone handset, a ring detect circuit 58 for detecting the ring signal of an incoming call and an on/off hook detect circuit 70. In the illustrated embodiment, the TAD 11 includes a filter and demodulating circuit 60 that is used for demodulating an incoming serial data stream relating to call related information. Data received by the filter and demodulating circuit 60 includes at least data representing the telephone number of an incoming call. Data relating to a household name or other call related information associated with the telephone number of the incoming call may also be received by the filter and demodulating circuit 60. The protocol necessary for the otherwise conventional portions of the circuit shown in FIG. 3 is described in U.S. Pat. No. 4,582,956, the disclosure of which is hereby incorporated by reference into the present specification.

Frequency shift keying, phase shift keying, quadrature amplitude modulation or any other suitable modulation technique may be used for transmitting a serial data stream to the TAD 11. A universal asynchronous receiver/transmitter (UART) 62 is used to convert the demodulated serial data received from the filter and demodulating circuit 60 to a parallel or serial format read by the processor 18 via address and data busses 64. Alternatively, the processor 18 can perform the UART and/or filter/demodulation function.

Operation of the TAD 11 shown in FIGS. 1–3 is as follows. When a caller initiates a call to the TAD 11, the ring interface circuit 58 provides a signal indicative of the incoming ring signal to the processor 18. Call related information is transmitted by the central office 13 to the TAD 11 during the silent period between the first and second rings, and is stored in the log data memory 55. After a default or selected number of rings, the TAD 11 answers the incoming call. On/off hook detect circuit 70 places the TAD 11 in the off-hook state, thereby causing the voice/playback circuit 20 to provide an outgoing announcing message to the remote caller. The voice recorder/playback circuit 20 is as disclosed in U.S. Pat. No. 5,524,140, the content of which is hereby incorporated into the present specification by reference.

Voice message signals are transmitted to and from the voice recorder/playback circuit 20 via the telephone line 14, RJ-11 jack 36, and telephone line interface circuit 48. The voice message signal is preferably digitized, compressed and presented to the processor 18 for storage in the voice message data section 56 of RAM 54. It can be appreciated that other storage devices such as cassette tapes are also possible.

The incoming voice messages are linked with the call related information stored in log data memory 55 for that incoming call. When playing back recorded voice messages, the call related information associated with the played back voice message is displayed on display 28.

The processor 18 can distinguish three states during a call, e.g., voice signals, DTMF signals, and dial tone or silence, by reading the level and modulation of the signals on the telephone line 14. The voice recorder/playback circuit 20 can distinguish between the tones of DTMF signals and the signal level ranges associated with human speech detected on the telephone line 14. If voice signals are detected, the processor 18 immediately executes a voice record routine. If no voice is present on the telephone line 14, but DTMF signals are being transmitted, the processor 18 executes a DTMF decode routine. If there is a dial tone or silence on the telephone line 14 for a predetermined period of time, e.g., five seconds, the processor 18 causes the on/off hook detect circuit 70 to go "on-hook", terminating the call.

Thus, when a telephone call comes into the TAD 11, the incoming call related information is displayed at display 28. If the caller leaves a voice message, the voice message is stored in voice data memory 56. If another call comes into the TAD 11 and via remote log-in deletes or otherwise affects a voice message, a user local to the TAD 11 may see via indicators 100 and 102 that a remote log-in has occurred and that a voice messages has been affected. If a user is remote to the TAD 11 and wishes to know if a remote log-in has occurred and/or if voice messages have been affected remotely, the user may access the TAD 11 remotely and will receive a voice prompt if a remote log-in has occurred and/or if a voice message was affected remotely.

The present invention has been described with reference to the reception of call related information such as is available in an on-hook condition, e.g., Type I (on-hook) caller ID service. With Type I caller ID service as discussed above, the caller ID information is transmitted generally during the silent interval between the first two rings. Type I caller ID systems which receive caller ID information relating to incoming calls when the called party is in an on-hook mode are known as Calling Identity Delivery (CID) systems. The invention is also applicable to Type II caller ID service which includes all Type I features but also accommodates the transmission of caller ID information while the TAD is already off-hook with another party, e.g., additionally accommodates call waiting (CW) service. The handset or speaker and microphone of a Type II called party's customer premises equipment is muted while caller ID information is transmitted by the central office. Type II caller ID/call waiting service is abbreviated as CIDCW.

While the disclosed embodiments describe the reception of caller ID information, the invention relates to the reception and processing of any call related information.

In an alternative embodiment, a voice message which is deleted or otherwise affected by a remote log-in may be temporarily retained in its original condition until a local user confirms the deletion and/or other change of status.

A voice messaging system in accordance with the principles of the present invention provides an effective way of ensuring that call related information for a voice message which is deleted or otherwise affected by a remote log-in is not lost without a local user's knowledge. Further, the voice message system provides an advantageous feature of indicating detailed information regarding a remote log-in which deleted the voice message and/or information regarding a call which had left the deleted voice message.

While the invention has been described with reference to the exemplary preferred embodiments thereof, those skilled in the art will be able to make various modifications to the described embodiments of the invention without departing from the true spirit and scope of the invention.

What is claimed is:

1. A voice messaging system comprising:

a processor in customer premises equipment to initiate an outgoing announcing voice message in response to an incoming call;

a voice recorder/playback circuit in said customer premises equipment to record and playback a voice message;

a detector in said customer premises equipment, operatively associated with said processor, to detect a remote log-in request to access voice messages recorded in said customer premises equipment; and an indicator, in said customer premises equipment, to indicate that a remote log-in request had previously changed a status of a voice message.

2. The voice messaging system according to claim 1, wherein:

said change of said status of said voice message is a deletion of said voice message.

3. The voice messaging system according to claim 1 further comprising:

a display, said indicator being visible on said display.

4. The voice messaging system according to claim 1, wherein:

said indicator is a voice signal emitted from said voice messaging system pursuant to a message playback mode of operation.

5. The voice messaging system according to claim 1, wherein:

said indicator is a voice signal emitted during a subsequent remote log-in.

6. A voice messaging system comprising:

initiating means in said customer premises equipment for initiating an outgoing announcing voice message in response to an incoming call;

voice recorder/playback means in said customer premises equipment for recording and playing back of a voice message;

detecting means in said customer premises equipment, operatively associated with said initiating means, for detecting a remote log-in request to access voice messages recorded at said voice messaging system; and indicating means in said customer premises equipment for indicating that a remote log-in request had previously changed a status of a voice message.

7. The voice messaging system according to claim 6, wherein:

said change of said status of said voice message is a deletion of said voice message.

8. The voice messaging system according to claim 6, further comprising:

a display, said indicating means being visible on said display.

9. The voice messaging system according to claim 6, wherein:

said indicating means is a voice signal emitted from said voice messaging system pursuant to a message playback mode of operation.

10. A method of indicating a remote log-in to a voice messaging system comprising:

allowing a remote log-in request to access remotely a voice message recorded in customer premises equipment;

allowing said remote log-in to affect a status of said voice message in said customer premises equipment; and indicating in said customer premises equipment that said remote log-in had previously affected said status of said voice message.

11. The method according to claim 10, wherein:

said remote log-in deletes said voice message in said customer premises equipment.

12. The method according to claim 10, wherein:

said allowance of said previous remote log-in request is indicated by a display on said voice messaging system.

13. The method according to claim 10, wherein:

said allowance of said previous remote log-in request is indicated by a voice signal emitted from said voice messaging system.

14. A method of remotely operating a voice messaging system comprising:

receiving a remote log-in request to access a voice message in customer premises equipment;

deleting by said remote log-in said voice message from memory in said customer premises equipment while maintaining in said customer premises equipment call information relating to said voice message;

maintaining information relating to said remote log-in which had deleted said voice message; and indicating in said customer premises equipment that said remote log-in had occurred.

15. The method according to claim 14, further comprising:

displaying on said customer premises equipment said call information relating to said deleted voice message, after said voice message has been deleted.

16. The method according to claim 14, wherein:

indicating in said customer premises equipment that said remote log-in had occurred includes displaying an indicator on said voice messaging system.

17. The method according to claim 14, wherein:

indicating in said customer premises equipment that said remote log-in had occurred includes emitting a voice signal from said customer premises equipment.

18. The method according to claim 14, wherein:

said information relating to said deleted voice message is a telephone number.

19. The method according to claim 18, wherein:

said information relating to said deleted voice message further comprises a household name associated with said telephone number.

20. A telephone answering device comprising:

a receiver to receive caller ID information relating to an incoming telephone call;

memory to store said caller ID information relating to said incoming call;

a processor to initiate an outgoing announcing message in response to said incoming call;

a voice recorder to record in said memory a voice message corresponding to said incoming call;

a detector, operatively associated with said processor, to detect a remote log-in wherein said processor is remotely controlled to access a recorded voice message; and an indicator on said telephone answering device to visibly indicate an occurrence of said remote log-in until said visible indication is erased by a user of said telephone answering device;

wherein said processor permits a deletion of said voice message by said remote log-in while caller ID information relating to said voice message is maintained.

21. The telephone answering device according to claim 20, wherein said processor comprises:

a digital signal processor.

22. The telephone answering device according to claim 20, further comprising:

an alpha-numeric keypad; and telephone handset.

23. The telephone answering device according to claim 20, wherein:

said detector is constructed and arranged to receive DTMF tones.

24. The telephone answering device according to claim 20, further comprising:

a display to display said caller ID information relating to said incoming call.

25. The telephone answering device according to claim 20, wherein said processor ensures that caller ID information relating to said remote log-in is maintained.

* * * * *